United States Patent
Wang (10) Patent No.: US 11,418,276 B2
(45) Date of Patent: Aug. 16, 2022

(54) BYTE STUFFING CIRCUIT AND BYTE STUFFING METHOD

(71) Applicant: Ufi Space co., Ltd., New Taipei (TW)

(72) Inventor: Yu-Min Wang, Taoyuan (TW)

(73) Assignee: Ufi Space co., Ltd., New Taipei (TW)

( * ) Notice: Subject to any disclaimer, the term of this patent is extended or adjusted under 35 U.S.C. 154(b) by 162 days.

(21) Appl. No.: 17/023,361

(22) Filed: Sep. 16, 2020

(65) Prior Publication Data

US 2022/0038199 A1 Feb. 3, 2022

(30) Foreign Application Priority Data

Jul. 31, 2020 (TW) ................................ 109125983

(51) Int. Cl.
| | | |
|---|---|---|
| *H04J 3/07* | (2006.01) | |
| *H04W 74/00* | (2009.01) | |
| *H04W 84/18* | (2009.01) | |
| *H04L 65/65* | (2022.01) | |

(52) U.S. Cl.
CPC ............ *H04J 3/076* (2013.01); *H04L 65/608* (2013.01); *H04W 74/002* (2013.01); *H04W 84/18* (2013.01)

(58) Field of Classification Search
CPC ..... H04J 3/076; H04L 65/608; H04W 74/002; H04W 84/18
See application file for complete search history.

(56) References Cited

U.S. PATENT DOCUMENTS

| | | | | | |
|---|---|---|---|---|---|
| 6,054,942 | A | * | 4/2000 | Stemmier | ............... H04L 29/06 370/476 |
| 2009/0290587 | A1 | * | 11/2009 | Kobayashi | ............ H04J 3/1617 370/395.1 |

FOREIGN PATENT DOCUMENTS

| | | | | | |
|---|---|---|---|---|---|
| CN | 1169806 | A | * | 1/1998 | ............. H04L 12/56 |
| CN | 101479969 | | | 7/2012 | |
| CN | 108111298 | A | * | 6/2018 | ............... H04L 9/06 |
| CN | 109274697 | A | * | 1/2019 | ............. H04L 29/06 |
| DE | 69906604 | | * | 2/2014 | ............... G06F 5/06 |
| FR | 2844652 | A1 | * | 3/2004 | ............ H04J 3/0626 |
| JP | 200317424 | A | * | 6/2003 | ................ H04J 3/07 |
| WO | WO-02059758 | A2 | * | 8/2002 | ............. H04L 29/06 |

OTHER PUBLICATIONS

"Parallel Architecture for High Speed Bit Stuffing and Byte Alignment", IBM TDB document# NB891131; Nov. 1, 1989 (Year: 1989).*

"Office Action of Taiwan Counterpart Application", dated May 6, 2021, pp. 1-3.

* cited by examiner

*Primary Examiner* — Joseph A Bednash
(74) *Attorney, Agent, or Firm* — JCIPRNET (57) ABSTRACT

A byte stuffing circuit and a byte stuffing method are provided. The byte stuffing method includes: receiving a first data stream and generating a second data stream according to the first data stream, where a first size of the first data stream is N bytes, and a second size of the second data stream is 2N bytes; in response to an Xth byte of the second data stream matching a first flag byte, overwriting the Xth byte with a first stuffing byte, and inserting a second stuffing byte into an (X+1)th byte of the second data stream, where X is a positive integer between 1 and 2N−1; combining a remnant data stream and a first part of the second data stream to generate a third data stream, and configuring a second part of the second data stream as the remnant data stream; and outputting the third data stream.

10 Claims, 7 Drawing Sheets

BYTE STUFFING CIRCUIT AND BYTE STUFFING METHOD

CROSS-REFERENCE TO RELATED APPLICATION

This application claims the priority benefit of Taiwan application serial no. 109125983, filed on Jul. 31, 2020. The entirety of the above-mentioned patent application is hereby incorporated by reference herein and made a part of this specification.

BACKGROUND

1. Technical Field

The disclosure relates to a byte stuffing circuit and a byte stuffing method.

2. Description of Related Art

Figure 1:
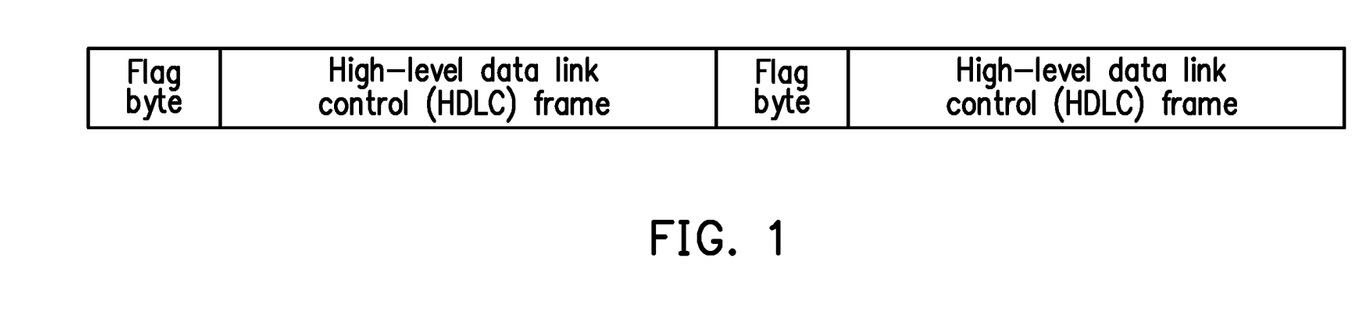
FIG. 1 is a schematic diagram of an HDLC data stream.

The high-level data link control (HDLC) protocol is an Ethernet data format used in wide area network (WAN). FIG. 1 is a schematic diagram of an HDLC data stream. The HDLC data stream may include several HDLC frames, and two HDLC frames may be separated by a flag byte. In general, HDLC data stream uses a hexadecimal value "7E" as the flag byte. In order for the receiving end of the HDLC data stream to correctly recognize the difference between the payload in the HDLC frame and the flag, the hexadecimal value "7E" in the HDLC frame needs to be replaced with other hexadecimal values.

Figure 2:
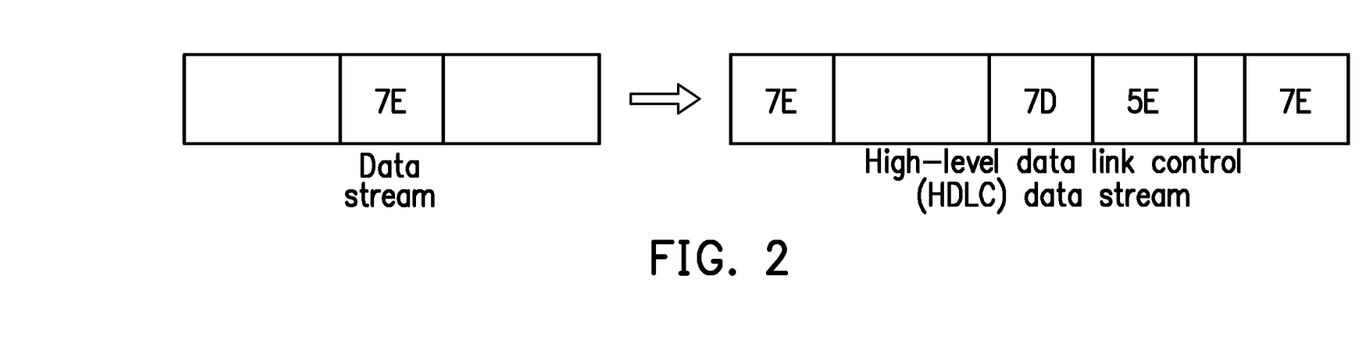
FIG. 2 is a schematic diagram of converting a data stream to an HDLC data stream by byte stuffing.

FIG. 2 is a schematic diagram of converting a data stream to an HDLC data stream by byte stuffing. The flag byte containing the hexadecimal value "7E" will be added to both ends of the data stream, the hexadecimal value "7E" in the data stream will be replaced with the hexadecimal value "7D5E", and the hexadecimal value "7D" in the data stream will be replaced with the hexadecimal value "7D5D". Therefore, after byte stuffing, the size of the payload of the HDLC data stream will be larger than the size of the original data stream.

On the other hand, as the carrier frequency of Ethernet increases, many common field programmable gate array (FPGA) or very large scale integrated circuit (VLSI) technologies have gradually become incapable of supporting the carrier frequency of Ethernet. For example, common FPGA or VLSI technologies may not support operating frequencies exceeding 500 megahertz (MHz), but the current carrier frequency of Ethernet may be as high as 10 gigahertz (GHz). In order to reduce the operating frequency, serial data of Ethernet may be changed to parallel data. For example, converting 64-byte serial data of 10 GHz to 64-byte parallel data may reduce the operating frequency from 10 GHz to 156.25 MHz.

However, if byte stuffing is performed on the parallel data to convert the parallel data to HDLC data, the size of the HDLC data may increase to exceed the size supported by the data bus of the parallel data.

SUMMARY

The disclosure provides a byte stuffing circuit and a byte stuffing method for performing byte stuffing on parallel data.

The byte stuffing circuit of the disclosure includes an input gate, a logic circuit, a remnant register, a remnant gate, and an output gate. The input gate receives a first data stream and generates a second data stream according to the first data stream; a first size of the first data stream is N bytes, and a second size of the second data stream is 2N bytes, in which N is a positive integer. A logic circuit is coupled to the input gate, and includes an Xth stage logic gate. The Xth stage logic gate overwrites the Xth byte with a first stuffing byte in response to the Xth byte of the second data stream matching a first flag byte and inserts a second stuffing byte into an (X+1)th byte of the second data stream, in which X is a positive integer between 1 and 2N−1. A remnant register stores a remnant data stream. A remnant gate is coupled to the logic circuit and the remnant register, in which the remnant gate combines the remnant data stream and a first part of the second data stream to generate a third data stream and configures a second part of the second data stream as the remnant data stream. An output gate is coupled to the remnant gate and outputs the third data stream.

In an embodiment of the disclosure, the Xth stage logic gate inserts a third stuffing byte into the (X+1)th byte in response to the Xth byte matching a second flag byte.

In an embodiment of the disclosure, a third size of the third data stream is N bytes, in which the remnant gate determines the first part of the second data stream according to a fourth size of the remnant data stream and the third size.

In an embodiment of the disclosure, the byte stuffing circuit further includes a remnant counter and a controller. The remnant counter stores a remnant count value corresponding to a fourth size of the remnant data stream. The controller is coupled to the input gate, the Xth stage logic gate, and the remnant gate, in which the controller stops the operation of the input gate and the Xth stage logic gate in response to the remnant count value being larger than or equal to N until the remnant count value updated is smaller than N.

In an embodiment of the disclosure, the Xth stage logic gate increases a count value by one in response to the Xth byte matching one of the first flag byte or a second flag byte, in which the remnant gate generates the remnant count value updated according to a count value and the remnant count value.

In an embodiment of the disclosure, the first flag byte is a hexadecimal value "7E", the first stuffing byte is a hexadecimal value "7D", and the second stuffing byte is a hexadecimal value "5E", in which the second flag byte is the hexadecimal value "7D", and the third stuffing byte is a hexadecimal value "5D".

In an embodiment of the disclosure, the third data stream is parallel data.

In an embodiment of the disclosure, the input gate performs zero stuffing on the first data stream to generate the second data stream.

In an embodiment of the disclosure, the Xth stage logic gate shifts the (X+1)th to a (2N)th byte of the second data stream to insert the second stuffing byte into the (X+1) byte.

The byte stuffing method of the disclosure includes: receiving a first data stream and generating a second data stream according to the first data stream; a first size of the first data stream is N bytes, and a second size of the second data stream is 2N bytes, where N is a positive integer; in response to an Xth byte of the second data stream matching a first flag byte, overwriting the Xth byte with a first stuffing byte, and inserting a second stuffing byte into an (X+1)th byte of the second data stream, where X is a positive integer between 1 and 2N−1; combining a remnant data stream and a first part of the second data stream to generate a third data stream, and configuring a second part of the second data stream as the remnant data stream; and outputting the third data stream.

In summary, according to the disclosure, byte stuffing may be performed on parallel data, and the bit-width of the byte-stuffed parallel data will not increase.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

Figure 3:
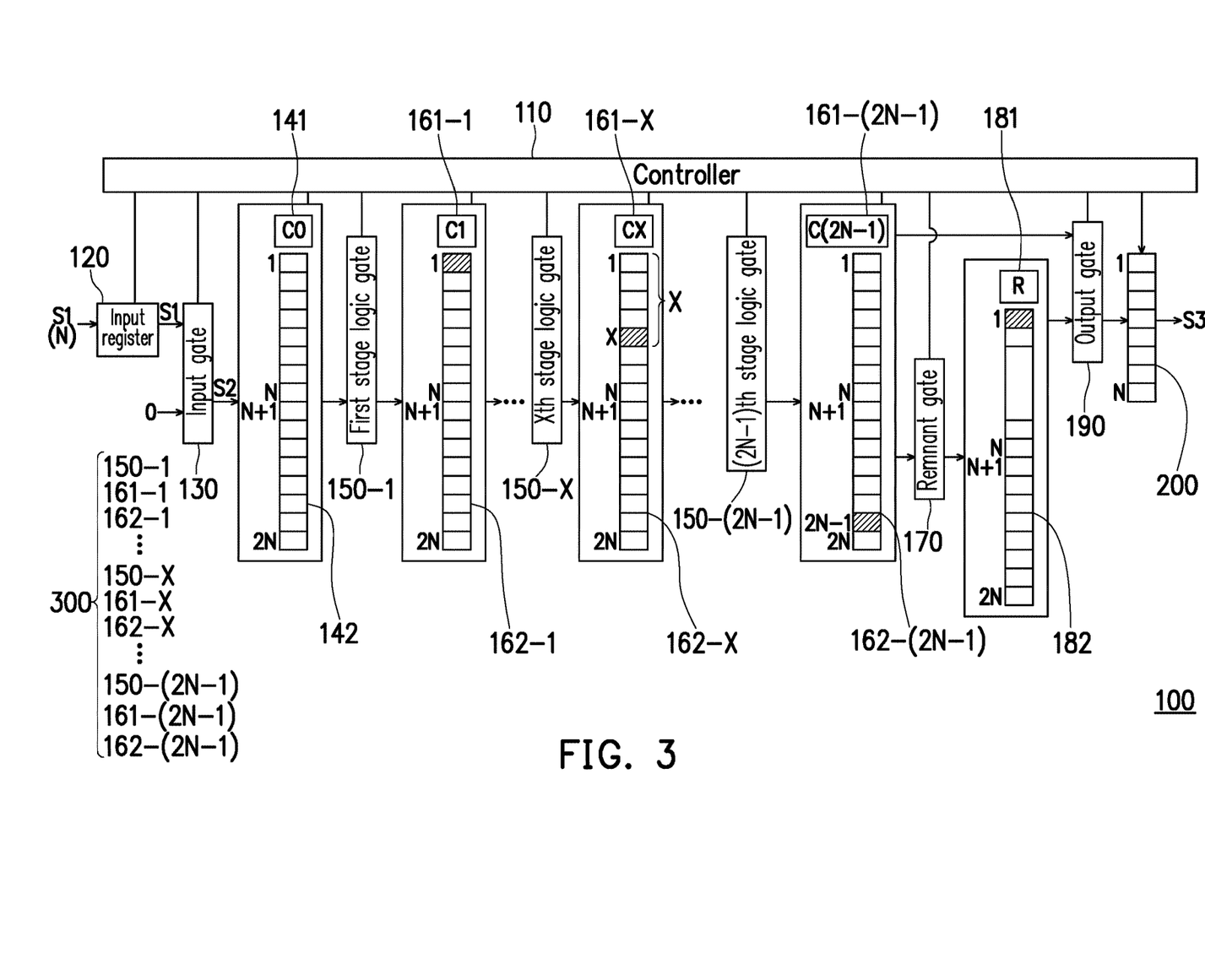
FIG. 3 illustrates a schematic diagram of a byte stuffing circuit according to an embodiment of the disclosure.

FIG. 3 illustrates a schematic diagram of a byte stuffing circuit 100 according to an embodiment of the disclosure. The byte stuffing circuit 100 may include a controller 110, an input register 120, an input gate 130, a counter 141, a register 142, a logic circuit 300, a remnant gate 170, a remnant counter 181, a remnant register 182, an output gate 190, and an output register 200. The byte stuffing circuit 100 may receive a data stream S1, perform byte stuffing on the data stream S1 to generate a data stream S3, and output the data stream S3. The data stream S1 may be serial data or parallel data and the data stream S3 may be parallel data. Each register in the byte stuffing circuit 100 may be a first in first out (FIFO) register.

The controller 110 may be coupled to and control the input register 120, the input gate 130, the counter 141, the register 142, the logic circuit 300, the remnant gate 170, the remnant counter 181, the remnant register 182, the output gate 190, and the output register 200. In detail, the controller 110 is, for example, a central processing unit (CPU), or other programmable general-purpose or special-purpose micro control units (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (arithmetic logic unit, ALU), a complex programmable logic device (CPLD), a FPGA, or other similar components or a combination of the above components.

The input register 120 may be configured to receive and store the data stream S1. The data stream S1 may be serial data, and the size of the data stream S1 may be N bytes. In the present embodiment, N may be 8, but the disclosure is not limited thereto. For example, N may be any positive integer.

The input gate 130 may be coupled to the input register 120, receive the data stream S1 from the input register 120, and generate a data stream S2 according to the data stream S1, in which the size of the data stream S2 may be 2N bytes. In the present embodiment, 2N may be 16, but the disclosure is not limited thereto. The input gate 130 may perform zero filling on the data stream S1 to generate the data stream S2. Specifically, the data stream S1 may include N bytes from the first byte to the Nth byte; the first byte is, for example, one of the most significant bit (MSB) or the least significant bit (LSB) of the data stream S1, and the Nth byte is, for example, the other one of the MSB or LSB of the data stream S1. The input gate 130 may add N bytes after the Nth byte of the data stream S1 to generate the data stream S2, in which the value of each newly added byte may be zero. In other words, the first to the Nth byte of the data stream S2 may be configured to store the data stream S1, and the (N+1)th to the (2N)th byte of the data stream S2 may be configured to store the value "zero".

The input gate 130 may be coupled to the register 142 and input the data stream S2 into the register 142 for storage, in which the size of the register 142 may be 2N bytes. A count value C0 in the counter 141 may be zero. The counter 141 and the register 142 may be coupled to the logic circuit 300.

The logic circuit 300 may include (2N−1) stages, and each stage may include a logic gate, a counter, and a register respectively coupled to the controller 110, in which the size of the register may be 2N bytes. For example, a first stage of the logic circuit 300 may include a first stage logic gate 150-1, a first stage counter 161-1, and a first stage register 162-1, in which the size of the first stage register 162-1 may be 2N bytes. Similarly, an Xth stage of the logic circuit 300 (X is a positive integer between 1 and (2N−1)) may include an Xth stage logic gate 150-X, an Xth stage counter 161-X, and an Xth stage register 162-X, in which the size of the Xth stage register 162-X may be 2N bytes. The (2N−1)th stage of the logic circuit 300 may include a (2N−1)th stage logic gate 150-(2N−1), a (2N−1)th stage counter 161-(2N−1) and a (2N−1)th stage register 162-(2N−1), in which the size of the (2N−1)th stage register 162-(2N−1) may be 2N bytes.

The first stage logic gate 150-1 may be coupled to the counter 141 and the register 142, and be coupled to the first stage counter 161-1 and the first stage register 162-1. The first stage logic gate 150-1 may receive the count value C0 from the counter 141, and may receive the data stream S2 from the register 142. The first stage logic gate 150-1 may be configured to determine whether the first byte of the data stream S2 (for example, one of the MSB or the LSB of the data stream S2) matches a first flag byte or a second flag byte, so as to determine whether to perform byte stuffing on the first byte of the data stream S2. If the first byte of the data stream S2 matches one of the first flag byte or the second flag byte, the first stage logic gate 150-1 may perform byte stuffing on the first byte of the data stream S2, and may increase the count value C0 by one. If the first byte of the data stream S2 does not match the first flag byte or the second flag byte, then the first stage logic gate 150-1 does not need to perform byte stuffing on the first byte of the data stream S2, and does not need to increase the count value C0 by one.

Figure 4:
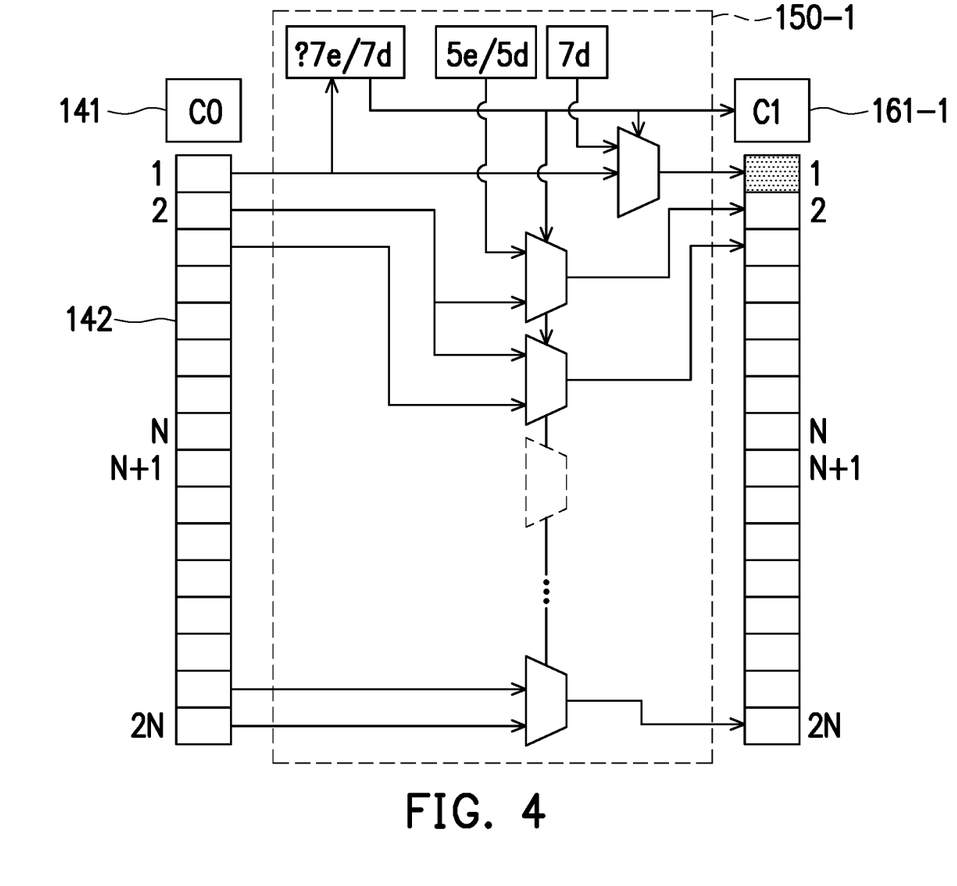
FIG. 4 illustrates a schematic diagram of performing byte stuffing on a first byte of a data stream according to an embodiment of the disclosure.

FIG. 4 illustrates a schematic diagram of performing byte stuffing on a first byte of the data stream S2 according to an embodiment of the disclosure. The first stage logic gate 150-1 may overwrite the first byte of the data stream S2 with a first stuffing byte in response to the first byte of the data stream S2 matching the first flag byte, insert a second stuffing byte into a second byte of the data stream S2, and increase the count value C0 by one. The first stage logic gate 150-1 may shift the second to the (2N)th byte to insert the second stuffing byte into the second byte of the data stream S2.

In an embodiment, the first flag byte may be a hexadecimal value "7E", the first stuffing byte may be a hexadecimal value "7D", and the second stuffing byte may be a hexadecimal value "5E". Accordingly, if the first stage logic gate 150-1 determines that the first byte of the data stream S2 in the register 142 is the hexadecimal value "7E", then the first stage logic gate 150-1 may perform byte stuffing on the first byte. In detail, the first stage logic gate 150-1 may overwrite the first byte of the data stream S2 with the hexadecimal value "7D", and shift the second to the (2N)th byte of the data stream S2. After the shift, the data originally located in an ith byte of the data stream S2 will be moved to an (i+1)th byte of the data stream S2, in which i is a positive integer between 2 and (2N−1). For example, the data originally located in the second byte of the data stream S2 will be moved to a third byte of the data stream S2, the data originally located in a (2N−1)th byte of the data stream S2 will be moved to the (2N)th byte of the data stream S2, and the data originally located in the (2N)th byte of data stream S2 will be deleted. After the shift is completed, the first stage logic gate 150-1 may write the hexadecimal value "5E" into the second byte of the data stream S2 to complete the byte stuffing on the second byte. After completing the byte stuffing on the first byte of the data stream S2, the first stage logic gate 150-1 may input the data stream S2 into the first stage register 162-1 for storage, in which the size of the first stage register 162-1 may be 2N bytes. On the other hand, if the first stage logic gate 150-1 determines that the first byte of the data stream S2 is the hexadecimal value "7E", then the first stage logic gate 150-1 may increase the count value C0 by one so as to generate a count value C1 and input the count value C1 into the first stage counter 161-1 for storage.

On the other hand, the first stage logic gate 150-1 may insert a third stuffing byte into the second byte of the data stream S2 in response to the first byte of the data stream S2 matching the second flag byte. The first stage logic gate 150-1 may shift the second to the (2N)th byte to insert the third stuffing byte into the second byte of the data stream S2.

In an embodiment, the second flag byte may be the hexadecimal value "7D", and the third stuffing byte may be the hexadecimal value "5D". Accordingly, if the first stage logic gate 150-1 determines that the first byte of the data stream S2 is the hexadecimal value "7D", then the first stage logic gate 150-1 may perform byte stuffing on the first byte. In detail, the first stage logic gate 150-1 may shift the second to the (2N)th byte of the data stream S2. After the shift, the data originally located in the ith byte of the data stream S2 will be moved to the (i+1)th byte of the data stream S2, in which i is a positive integer between 2 and (2N−1). After the shift is completed, the first stage logic gate 150-1 may write the hexadecimal value "5D" into the second byte of the data stream S2 to complete the byte stuffing on the second byte.

After completing the byte stuffing of the first byte on the data stream S2, the first stage logic gate 150-1 may input the data stream S2 into the first stage register 162-1 for storage. On the other hand, if the first stage logic gate 150-1 determines that the first byte of the data stream S2 is the hexadecimal value "7D", then the first stage logic gate 150-1 may increase the count value C0 by one so as to generate a count value C1 and input the count value C1 into the first stage counter 161-1 for storage.

Returning to FIG. 3, the controller 110 may input the count value C1 in the first stage counter 161-1 and the data stream S2 in the first stage register 162-1 into a second stage of the logic circuit 300 to be determined by the second stage whether to perform byte stuffing on the second byte of the data stream S2. Likewise, the Xth stage logic gate 150-X of an Xth stage of the logic circuit 300 may receive a count value C(X−1) and the data stream S2 from an (X−1) stage of the logic circuit 300, and may determine whether to perform byte stuffing on an Xth byte of the data stream S2. If the Xth byte of the data stream S2 matches one of the first flag byte or the second flag byte, then the Xth stage logic gate 150-X may perform byte stuffing on the Xth byte of the data stream S2 and may increase the count value C(X−1) by one. If the Xth byte of the data stream S2 does not match the first flag byte or the second flag byte, then the Xth stage logic gate 150-X does not need to perform byte stuffing on the Xth byte of the data stream S2, and does not need to increase the count value C(X−1) by one.

Figure 5:
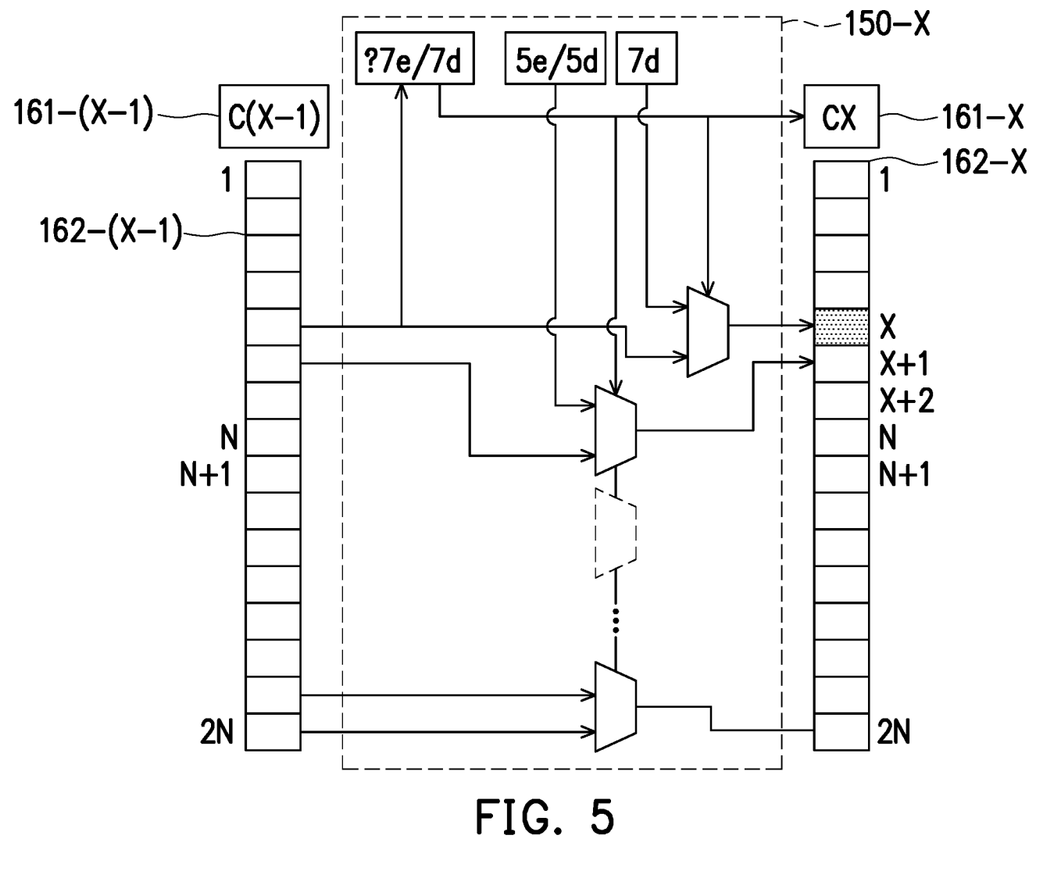
FIG. 5 illustrates a schematic diagram of performing byte stuffing on an Xth byte of a data stream according to an embodiment of the disclosure.

FIG. 5 illustrates a schematic diagram of performing byte stuffing on the Xth byte of the data stream S2 according to an embodiment of the disclosure. The (X−1)th stage of the logic circuit 300 may include an (X−1)th stage logic gate 150-(X−1), an (X−1)th stage counter 161-(X−1), and an (X−1)th stage register 162-(X−1). The Xth stage logic gate 150-X may be coupled to the (X−1)th stage counter 161-(X−1) and the (X−1)th stage register 162-(X−1), and may be coupled to the Xth stage counter 161-X and the Xth stage register 162-X. The Xth stage logic gate 150-X may obtain the first to the (X−1)th byte of the data stream S2 from the (X−1) stage register 162-(X−1), and input the first to the (X−1)th byte of the data stream S2 into the Xth stage register 162-X for storage. In addition, the Xth stage logic gate 150-X may overwrite the Xth byte of the data stream S2 with the first stuffing byte in response to the Xth byte of the data stream S2 matching the first flag byte, insert the second stuffing byte into an (X+1)th byte of the data stream S2, and increase the count value C(X−1) by one. The Xth stage logic gate 150-X may shift the Xth to the (2N)th byte to insert the second stuffing byte into the Xth byte of the data stream S2.

In an embodiment, the first flag byte may be the hexadecimal value "7E", the first stuffing byte may be the hexadecimal value "7D", and the second stuffing byte may be the hexadecimal value "5E". Accordingly, if the Xth stage logic gate 150-X determines that the Xth byte of the data stream S2 in the (X−1)th stage register 162-(X−1) is the hexadecimal value "7E", then the Xth stage logic gate 150-X may perform byte stuffing on the Xth byte.

In detail, the Xth stage logic gate 150-X may overwrite the Xth byte of the data stream S2 with the hexadecimal value "7D" and shift the (X+1)th to the (2N)th byte of the data stream S2. After the shift, the data originally located in the ith byte of the data stream S2 will be moved to the (i+1)th byte of the data stream S2, in which i is a positive integer between X+1 and (2N−1). For example, the data originally located in the (X+1)th byte of the data stream S2 will be moved to an (X+2)th byte of the data stream S2, and the data originally located in the (2N)th byte of the data stream S2 will be deleted. After the shift is completed, the Xth stage logic gate 150-X may write the hexadecimal value "5E" into the (X+1)th byte of the data stream S2 to complete the byte stuffing on the Xth byte. After completing the byte stuffing on the Xth byte of the data stream S2, the Xth stage logic gate 150-X may input the Xth byte to the (2N)th byte of the data stream S2 into the Xth stage register 162-X for storage, in which the size of the Xth stage register 162-X may be 2N bytes. On the other hand, if the Xth stage logic gate 150-X determines that the Xth byte of the data stream S2 is the hexadecimal value "7E", then the first stage logic gate 150-1 may increase the count value C(X−1) by one so as to generate a count value CX and input the count value CX into the Xth stage counter 161-X for storage.

On the other hand, the Xth stage logic gate 150-X may insert the third stuffing byte into the (X+1)th byte of the data stream S2 in response to the Xth byte of the data stream S2 matching the second flag byte. The Xth stage logic gate 150-X may shift the (X+1)th to the (2N)th byte to insert the third stuffing byte into the (X+1)th byte of the data stream S2.

In an embodiment, the second flag byte may be the hexadecimal value "7D", and the third stuffing byte may be the hexadecimal value "5D". Accordingly, if the Xth stage logic gate 150-X determines that the Xth byte of the data stream S2 is the hexadecimal value "7D", then the Xth stage logic gate 150-X may perform byte stuffing on the Xth byte. In detail, the Xth stage logic gate 150-X may shift the (X+1)th to the (2N)th byte of the data stream S2. After the shift, the data originally located in the ith byte of the data stream S2 will be moved to the (i+1)th byte of the data stream S2, in which i is a positive integer between X+1 and (2N−1). For example, the data originally located in the (X+1)th byte of the data stream S2 will be moved to the (X+2)th byte of the data stream S2, and the data originally located in the (2N)th byte of the data stream S2 will be deleted. After the shift is completed, the Xth stage logic gate 150-X may write the hexadecimal value "5D" into the (X+1)th byte of the data stream S2 to complete the byte stuffing on the Xth byte. After completing the byte stuffing on the Xth byte of the data stream S2, the Xth stage logic gate 150-X may input the Xth byte to the (2N)th byte of the data stream S2 into the Xth stage register 162-X for storage. On the other hand, if the Xth stage logic gate 150-X determines that the Xth byte of the data stream S2 is the hexadecimal value "7D", then the Xth stage logic gate 150-X may increase the count value C(X−1) by one so as to generate a count value CX and input the count value CX into the Xth stage counter 161-X for storage.

Returning to FIG. 3, similar to the first or the Xth stage of the logic circuit 300 described above, the last stage of the logic circuit 300, that is, the (2N−1)th stage, may determine whether to perform byte stuffing on the (2N−1)th byte of the data stream S2. The (2N−1)th stage logic gate 151-(2N−1) may be coupled to the (2N−1)th stage counter 161-(2N−1) and the (2N−1)th stage register 162-(2N−1). After performing the steps similar to the steps performed on the first stage logic gate 151-1 or the Xth stage logic gate 151-X, the (2N−1)th stage logic gate 151-(2N−1) may input a count value C(2N−1) into the (2N−1)th stage counter 161-(2N−1) for storage and input the data stream S2 into the (2N−1)th stage register 162-(2N−1) for storage, in which the size of the (2N−1)th stage register 162-(2N−1) may be 2N bytes.

The remnant gate 170 may be coupled to the (2N−1)th stage counter 161-(2N−1) and the (2N−1)th stage register 162-(2N−1), and may be coupled to the remnant counter 181 and the remnant register 182. The remnant counter 181 and the remnant register 182 may be coupled to the output gate 190. The output gate 190 may be coupled to the output register 200. The size of the remnant register 182 may be 2N bytes, and may be configured to store the remnant data stream. The remnant counter 181 may store a remnant count value R, in which the remnant count value R corresponds to the size of the remnant data stream. For example, if the size of the remnant data stream is K bytes, then the remnant count value R may be equal to K, in which K is a positive integer between 0 and 2N.

The remnant gate 170 may determine the size of the remnant data stream in the remnant register 182 according to the remnant count value R in the remnant counter 181. If the size of the remnant data stream (or the remnant count value R in the remnant counter 181) is smaller than the size of the data stream S3 (for example: N bytes), then the remnant gate 170 may combine the remnant data stream in the remnant register 182 with the first part of the data stream S2 in the (2N−1)th stage register 161-(2N−1) to generate the data stream S3. The remnant gate 170 may determine the size of the first part of the data stream S2 according to the size of the data stream S3 and the remnant count value R. The size of the first part of the data stream S2 may be the size of the data stream S3 minus the remnant count value R. After the data stream S3 is generated, the remnant gate 170 may output the data stream S3 to the output gate 190, and the output gate 190 may store and output the data stream S3 using the output register 200. Then, the remnant gate 170 may configure the second part of the data stream S2 (i.e. the remaining part except the first part) as a new remnant data stream, and may update the remnant count value R according to the count value C(2N−1) in the (2N−1)th stage counter 161-(2N−1) and the remnant count value R, in which the updated remnant count value R is equal to the sum of the count value C(2N−1) and the original remnant count value R (i.e.: updated R=R+C(2N−1)). The new remnant data stream may be stored by the remnant register 182.

Figure 6:
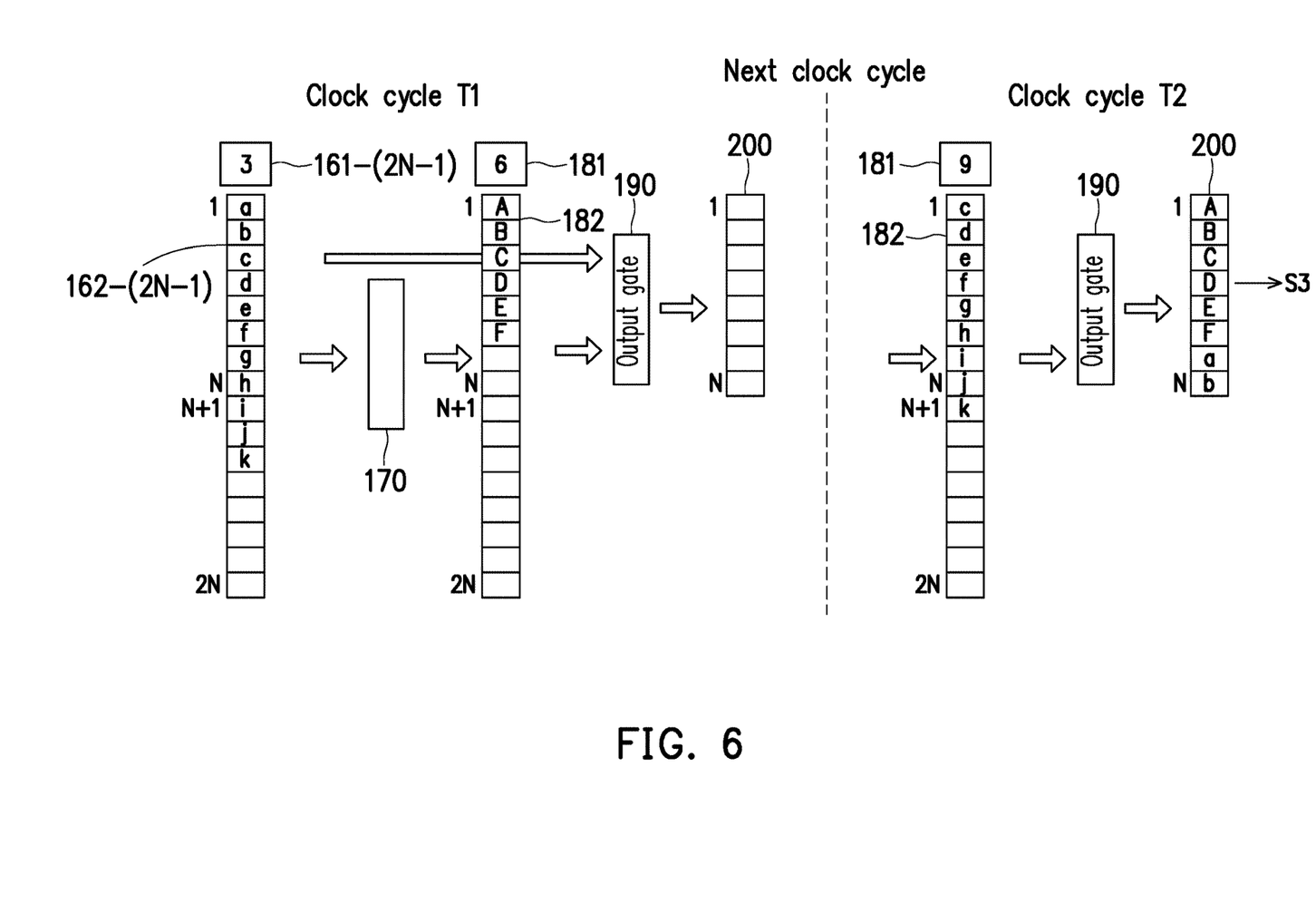
FIG. 6 illustrates a schematic diagram of the operation of a remnant gate and an output gate in clock cycle T1 and clock cycle T2 according to an embodiment of the disclosure.

FIG. 6 illustrates a schematic diagram of the operation of the remnant gate 170 and the output gate 190 in clock cycle T1 and clock cycle T2 according to an embodiment of the disclosure. In the present embodiment, it is supposed that the logic circuit 300 performs a total of three byte stuffings on the data stream S2, such that the data contained in the data stream S2 is expanded, from N bytes of the data stream S1, to (N+3) bytes, and that the count value C(2N−1) is equal to 3, in which N is equal to 8. In addition, it is supposed that the size of the remnant data stream contained in the remnant register 182 is 6 bytes, and the remnant count value R in the remnant counter 181 is equal to 6.

During clock cycle T1, the remnant gate 170 may combine the first part of the data stream S2 and the remnant data stream in response to the remnant count value R (R=6) being smaller than N (N=8) so as to generate the data stream S3. The remnant gate 170 may determine that the size of the first part of the data stream S2 is equal to 2 bytes based on the difference between the size of the data stream S3 (i.e.: N=8) and the remnant count value R (i.e.: R=6) being 2 (i.e.: 8−6=2). The remnant gate 170 may combine the remnant data stream in the remnant register 182 with the 2 bytes (for example, the first byte and the second byte) of the data stream S2 in the (2N−1)th stage register 162-(2N−1) to generate the data stream S3. After the data stream S3 is output to the output register 200, the remnant register 182 may be cleared. The remnant gate 170 may configure the second part of the data stream S2 (i.e. the remaining 9 bytes) as the new remnant data stream, and store the new remnant data stream using the remnant register 182. The remnant gate 170 may update the remnant count value in the remnant counter 181 to 9 (i.e.: 6+3=9) according to the sum of the original remnant count value R (i.e.: R=6) and the count value C(2N-1) (i.e.: C(2N-1)=3).

On the other hand, if the size of the remnant data stream (or the remnant count value R in the remnant counter 181) is larger than or equal to the size of the data stream S3 (for example, N bytes), then the remnant gate 170 may notify the controller 110 to stop the operation of the input gate 130 and the logic circuit 300 until the updated remnant count value R is smaller than N. The remnant gate 170 may configure the N bytes in the remnant data stream S2 as the data stream S3. After the data stream S3 is generated, the remnant gate 170 may output the data stream S3 to the output gate 190, and the output gate 190 may store and output the data stream S3 using the output register 200. Then, the remnant gate 170 may update the remnant count value R according to the size of the data stream S3 and the remnant count value R, in which the updated remnant count value R is equal to the difference between the original remnant count value R and N (i.e., the updated R=R-N).

Figure 7:
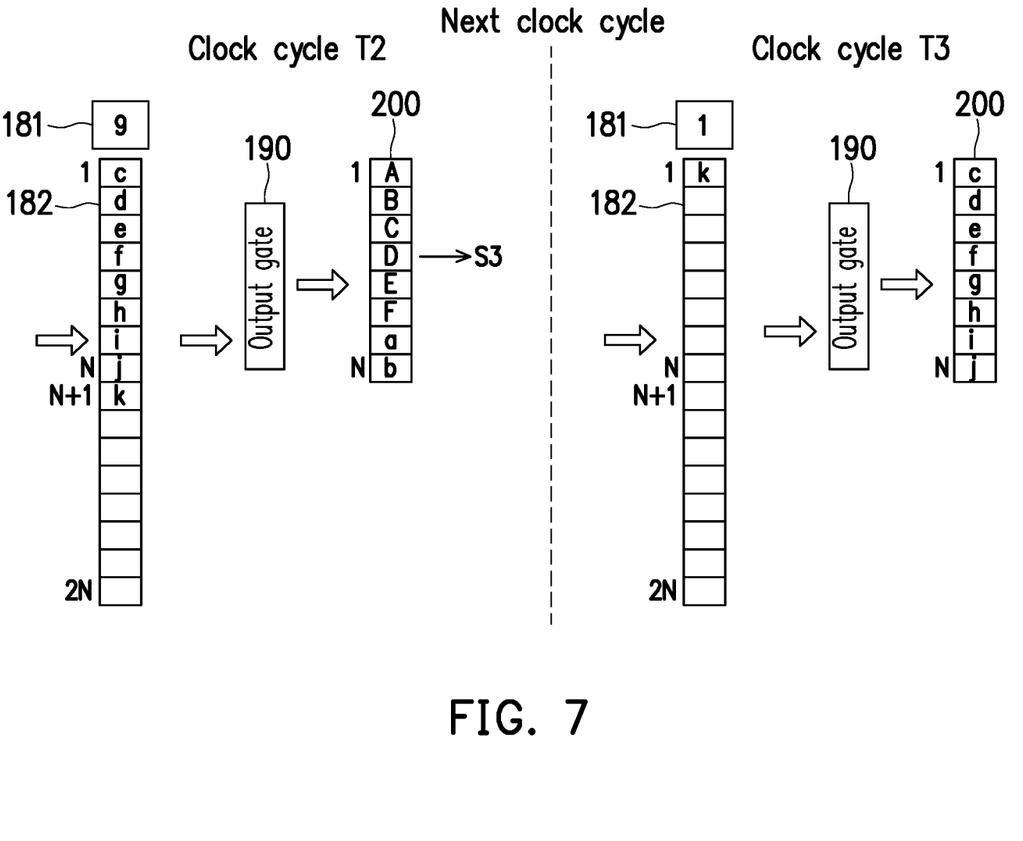
FIG. 7 illustrates a schematic diagram of the operation of a remnant gate and an output gate in clock cycle T2 and clock cycle T3 according to an embodiment of the disclosure.

FIG. 7 illustrates a schematic diagram of the operation of the remnant gate 170 and the output gate 190 in clock cycle T2 and clock cycle T3 according to an embodiment of the disclosure. In the present embodiment, it is supposed that N is equal to 8, and that the size of the remnant data stream contained in the remnant register 182 is 9 bytes, and the remnant count value R in the remnant counter 181 is equal to 9.

During clock cycle T2, the remnant gate 170 may notify the controller 110 to stop the operation of the input gate 130 and the logic circuit 300 in response to the remnant count value R (i.e.: R=9) being larger than or equal to N (i.e.: N=8). During the period in which the input gate 130 and the logic circuit 300 stop operating, no new data stream will be input to the remnant register 182. The remnant gate 170 may configure the data stream of the 8 bytes in the remnant data stream S2 as the data stream S3. After the data stream S3 is generated, the remnant gate 170 may output the data stream S3 to the output gate 190, and the output gate 190 may store and output the data stream S3 using the output register 200. Then, the remnant gate 170 may update the remnant count value R in the remnant counter 181 to 1 (i.e.: 9-8=1) according to the original remnant count value R (i.e.: R=9) and the size of the data stream S3 (i.e.: N=8).

Then, during clock cycle T3, the remnant gate 170 may determine that the updated remnant count value R (i.e.: R=1) is smaller than N (i.e.: N=8). Accordingly, the remnant gate 170 may notify the controller 110 to resume the operation of the input gate 130 and the logic circuit 300.

Figure 8:
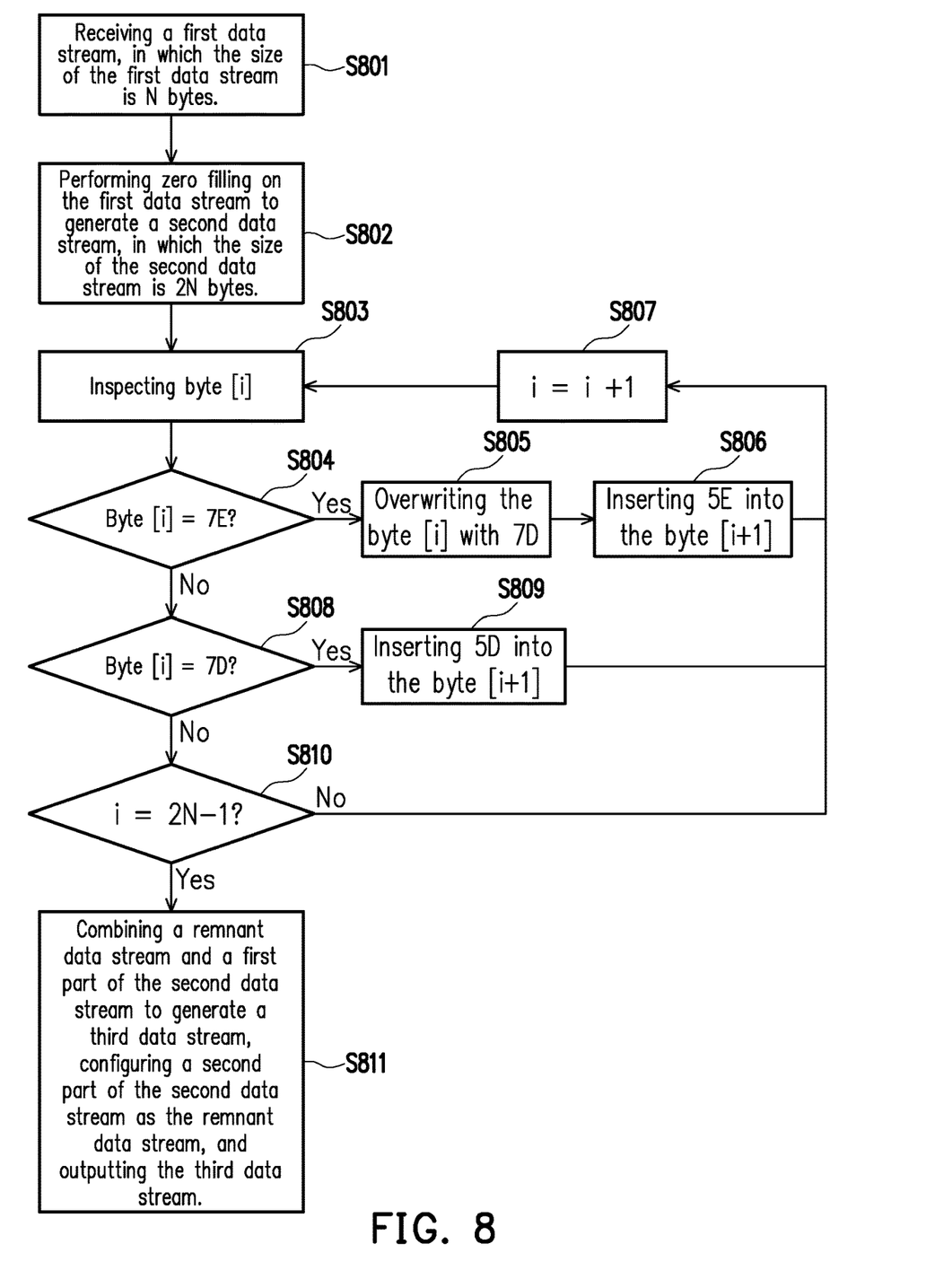
FIG. 8 illustrates a flow chart of a byte stuffing method according to an embodiment of the disclosure.

FIG. 8 illustrates a flow chart of a byte stuffing method according to an embodiment of the disclosure, in which the byte stuffing method may be implemented by the byte stuffing circuit 100 shown in FIG. 3. In step S801, a first data stream is received, and the size of the first data stream is N bytes. N may be a positive integer. In step S802, zero stuffing is performed on the first data stream to generate a second data stream, in which the size of the second data stream is 2N bytes. In step S803, byte [i] (i.e.: the ith byte of the second data stream) of the second data stream is inspected, in which an initial value of i is 1, and i is a positive integer between 1 and (2N-1). In step S804, whether the byte [i] of the second data stream matches a hexadecimal value "7E" is determined. If yes, step S805 is proceeded. If not, step S808 is proceeded. In step S805, the byte [i] is overwritten with a hexadecimal value "7D". In step S806, a hexadecimal value "5E" is inserted into a byte [i+1]. In step S807, i is made equal to (i+1). In step S808, whether the byte [i] of the second data stream matches a hexadecimal value "7D" is determined. If yes, step S809 is proceeded. If not, step S810 is proceeded. In step S809, a hexadecimal value "5D" is inserted into the byte [i+1]. In step S810, whether i is equal to (2N-1) is determined. If yes, step S811 is proceeded. If not, step S807 is proceeded. In step S811, a remnant data stream and a first part of the second data stream are combined to generate a third data stream, a second part of the second data stream is configured as the remnant data stream, and the third data stream is output.

In summary, according to the logic circuit of the disclosure, byte-stuffing may be performed on the data stream and the byte-stuffed data stream may be stored by a register of increased size. If the size of the remnant data stream in the remnant register is smaller than a preset value, then the remnant gate may combine a part of the byte-stuffed data stream with the remnant data stream in the remnant register to generate an output data stream. If the size of the remnant data stream in the remnant register is larger than or equal to the preset value, then the controller may stop the operation of the logic circuit and the remnant gate such that the controller may clear part of the data in the remnant register. After part of the data in the remnant register is cleared, the controller may resume the operation of the logic circuit and the remnant gate. The logic circuit may continue to perform byte stuffing on the data stream, and the remnant gate may continue to combine a part of the byte-stuffed data stream with the remnant data stream in the remnant register to generate an output data stream. Therefore, according to the disclosure, byte stuffing may be performed on parallel data, and the byte-stuffed parallel data may be output correctly.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A byte stuffing circuit, comprising:
   an input gate, receiving a first data stream and generating a second data stream according to the first data stream, wherein a first size of the first data stream is N bytes, and a second size of the second data stream is 2N bytes, wherein N is a positive integer;
   a logic circuit, coupled to the input gate, comprising:
      an Xth stage logic gate, overwriting the Xth byte with a first stuffing byte in response to the Xth byte of the second data stream matching a first flag byte and inserting a second stuffing byte into an (X+1)th byte of the second data stream, wherein X is a positive integer between 1 and 2N-1;
   a remnant register, storing a remnant data stream;
   a remnant gate, coupled to the logic circuit and the remnant register, wherein the remnant gate combines the remnant data stream and a first part of the second data stream to generate a third data stream and configures a second part of the second data stream as the remnant data stream; and
   an output gate, coupled to the remnant gate, outputting the third data stream.

2. The byte stuffing circuit according to claim 1, wherein the Xth stage logic gate inserts a third stuffing byte into the (X+1)th byte in response to the Xth byte matching a second flag byte.

3. The byte stuffing circuit according to claim 1, wherein a third size of the third data stream is N bytes, wherein the remnant gate determines the first part of the second data stream according to a fourth size of the remnant data stream and the third size.

4. The byte stuffing circuit according to claim 1, further comprising:
- a remnant counter, storing a remnant count value corresponding to a fourth size of the remnant data stream; and
- a controller, coupled to the input gate, the Xth stage logic gate, and the remnant gate, wherein the controller stops the operation of the input gate and the Xth stage logic gate in response to the remnant count value being larger than or equal to N until the remnant count value updated is smaller than N.

5. The byte stuffing circuit according to claim 4, wherein the Xth stage logic gate increases a count value by one in response to the Xth byte matching one of the first flag byte or a second flag byte, wherein the remnant gate generates the remnant count value updated according to a count value and the remnant count value.

6. The byte stuffing circuit according to claim 2, wherein the first flag byte is a hexadecimal value "7E", the first stuffing byte is a hexadecimal value "7D", and the second stuffing byte is a hexadecimal value "5E", wherein the second flag byte is the hexadecimal value "7D", and the third stuffing byte is a hexadecimal value "5D".

7. The byte stuffing circuit according to claim 1, wherein the third data stream is parallel data.

8. The byte stuffing circuit according to claim 1, wherein the input gate performs zero stuffing on the first data stream to generate the second data stream.

9. The byte stuffing circuit according to claim 8, wherein the Xth stage logic gate shifts the (X+1)th to a (2N)th byte of the second data stream to insert the second stuffing byte into the (X+1) byte.

10. A byte stuffing method, comprising:
- receiving a first data stream and generating a second data stream according to the first data stream, wherein a first size of the first data stream is N bytes, and a second size of the second data stream is 2N bytes, wherein N is a positive integer;
- overwriting the Xth byte with a first stuffing byte in response to an Xth byte of the second data stream matching a first flag byte and inserting a second stuffing byte into an (X+1)th byte of the second data stream, wherein X is a positive integer between 1 and 2N−1;
- combining a remnant data stream and a first part of the second data stream to generate a third data stream and configuring a second part of the second data stream as the remnant data stream; and
- outputting the third data stream.

\* \* \* \* \*